United States Patent Office 3,466,277
Patented Sept. 9, 1969

---

3,466,277
N-ALLYLIC CYCLOHEXYL LOWER ALKYL NORMORPHINES
Herbert Merz, Hans-Detlef Schroeder, Adolf Langbein, and Karl Zeile, Ingelheim am Rhein, Germany, assignors to Boehringer Ingelheim G.m.b.H., Ingelheim am Rhein, Germany, a corporation of Germany
No Drawing. Filed Dec. 11, 1967, Ser. No. 689,314
Claims priority, application Germany, Dec. 13, 1966,
B 90,286
Int. Cl. C07d 43/28; A61k 27/00
U.S. Cl. 260—240                                4 Claims

---

ABSTRACT OF THE DISCLOSURE

Novel N-substituted-normorphines of the formula

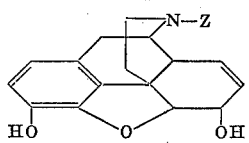

wherein Z is an allyl group, the double bond of which belongs endocyclically or exocyclically to an alicyclic six-membered ring and their non-toxic, pharmaceutically acceptable acid addition salts, having analgesic and morphine antagonistic properties.

---

OBJECTS OF THE INVENTION

It is an object of the invention to provide the novel N-substituted-normorphines of Formula I.

It is another object of the invention to provide a novel process for the preparation of the compounds of Formula I.

It is a further object of the invention to provide novel analgesic compositions.

It is an additional object of the invention to provide a novel method of relieving pain in warm-blooded animals.

These and other objects and advantages of the invention will become obvious from the following detailed description.

THE INVENTION

The novel N-substituted-normorphines of the invention are selected from the group consisting of compounds of the formula

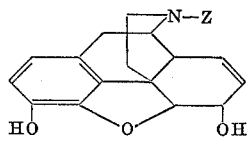

wherein Z is an allyl group, the double bond of which belongs endocyclically or exocyclically to an alicyclic six-membered ring and their non-toxic, pharmaceutically acceptable acid addition salts. Z may have 6 to 8 carbon atoms and comprises cyclohexylideneethyl, cyclohexene-(1)-yl-methyl and cyclohexene-(2)-yl, etc.

Examples of suitable acids for the formation of non-toxic, pharmaceutically acceptable acid addition salts are inorganic acids such as hydrochloric acid, hydrobromic acid, sulfuric acid, phosphoric acid, etc. and organic acids such as acetic acid, propionic acid, caproic acid, methane sulfonic acid, tartaric acid, fumaric acid, lactic acid, ascorbic acid, citric acid, maleic acid, 8-chloro-theophylline, etc.

The novel process of the invention for the preparation of the N-substituted-normorphines of the invention comprises reacting normorphine with a compound of the formula Z—Hal wherein Z has the above definition and Hal is a halogen atom. The reaction is preferably carried out at about 30 to 150° C. in an inert organic solvent such as lower alkanols, tetrahydrofuran, dimethylformamide, or mixtures thereof such as dimethylformamide and tetrahydrofuran and in the presence of an acid binding agent such as sodium bicarbonate, sodium carbonate, other alkali metal carbonates and bicarbonates, calcium oxide, magnesium oxide, dicyclohexylethylamine, etc. Equimolar amounts of the reactants may be used, however, an excess of the Z—Hal reactant is preferably used.

The halogenides of an alicyclic six-membered ring with an allyl grouping used as reaction components, the double bond of which belongs endocyclically or exocyclically to the ring, and the normorphine are known from the literature.

The N-substituted-normorphines of Formula I possess an excellent morphine-antagonistic activity and a pronounced analgesic activity. The said compounds are therefore useful in warm-blooded animals as analgesics or as additives to addictive analgesics such as morphine, pethidine or ketobemidon.

The novel analgesic compositions of the invention are comprised of 1 to 150 mg., preferably 10 to 50 mg., of at least one compound selected from the group consisting of normorphines of the formula

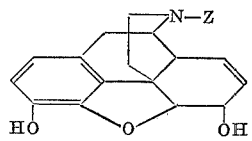

wherein Z is an allyl group, the double bond of which belongs endocyclically or exocyclically to an alicyclic six-membered ring and their non-toxic, pharmaceutically acceptable acid addition salts and a pharmaceutical carrier. The compositions may be in the form of pills, dragees, tablets, suppositories, emulsions, solutions and injectable solutions or suspensions.

The novel method of the invention for relieving pain in warm-blooded animals comprising administering to warm-blooded animals an effective amount of at least one compound selected from the group consisting of compounds of the formula

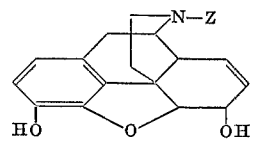

wherein Z is an allyl group, the double bond of which belongs endocyclically or exocyclically to an alicyclic six-membered ring and their non-toxic, pharmaceutically acceptable acid additions salts. The said compounds may be administered transcutaneously, orally or rectally. The usual useful daily dose is 100 to 200 mg./kg., depending upon the mode of administration.

In the following examples there are described several preferred embodiments to illustrate the invention. However, it should be understood that the invention is not intended to be limited to the specific embodiments.

EXAMPLE I

Preparation of N-cyclohexylideneethyl-normorphine 2.7 g. (0.01 mole) of normorphine, 1.26 g. of sodium bicarbonate and 2.1 g. (0.011 mole) of cyclohexylideneethylbromide in 10 ml. of dimethylformamide and 25 ml. of tetrahydrofuran were refluxed for 2 hours. Then the solution evaporated in a rotation-evaporator under water jet vacuum and the residue was shaken in a separation funnel with chloroform and water. After separation of the phases, the aqueous phase was shaken once more with chloroform. The united chloroform solutions were washed three times with water, dried over sodium sulfate and evaporated to dryness. The remaining crude base may be crystallized as such or as its acid addition salt.

A preliminary purification with aluminum oxide is more appropriate. For this purpose the crude base was dissolved in chloroform and passed through a column with 75 g. of aluminum oxide (neutral, activity step II). The column was eluted first with chloroform and then with chloroform-ethanol (90:10). The chloroform-ethanol eluate was evaporated and the residue was dissolved in ether containing a few drops of ethanol. The solution was admixed with petroluem ether until it was turbid and crystallization is attained by scratching. After the mixture had stood over night in the refrigerator, it was filtered and the residue was dried in a vacuum desiccator to obtain 1.5 g. of N-cyclohexilideneethyl-normorphine having a melting point of 195–197° C. Additional product was obtained from the mother liquor.

1.65 g. of N-cyclohexylideneethyl-normorphine were dissolved in 16.5 ml. of ethanol and then the solution was filtered and admixed with 8.25 ml. of water. The product crystallized while standing in the refrigerator over night. After having been dried at 70° C. under waterjet vacuum over $P_2O_5$, the substance melted first at 100–105° C., and when heated further became solid and crystalline again and melted again at 199–200° C.

The salicylate salt of the said product was obtained by dissolving 57 mg. of the free base and 23 mg. of salicylic acid in several drops of ethanol and admixing the resulting solution with absolute ether (approximately 10 ml.) and petroleum ether until it was turbid. 70 mg. of the salicylate salt crystallized which was recrystallized from ethanol-ether-petroleum ether to obtain the salt having a melting point of 245–248° C. (decomposition).

EXAMPLE II

Preparation of N-cyclohexene-(2)-yl-normorphine 2.7 g. (0.01 mole) of normorphine, 1.6 g. of sodium carbonate and 2.0 g. (0.0125 mole) of 2-cyclohexenylbromide in 10 ml. of dimethylformamide and 25 ml. of tetrahydrofuran were refluxed for 6 hours. Then, the mixture was processed as described in Example I. Crystallization of the base purified over aluminum oxide from ethanol-ether-petroleum gave 1.3 g. of N-cyclohexene-(2)-yl-normorphine which melted after drying in the desiccator at 100–105° C., became solid when heated further and melted again at 196–198° C. The said compound was recrystallized from aqueous ethanol as in Example I to obtain 0.9 g. of the said product melting at 201–203° C. after drying at 70° C. under waterjet vacuum over $P_2O_5$. Its salicylate, prepared as in Example I, melted at at 214–215° C.

EXAMPLE III

Preparation of N-(cyclohexene-(1)-yl-methyl)-normorphine 2.7 g. (0.01 mole) of normorphine, 1.26 g. of sodium bicarbonate and 1.93 g. (0.011 mole) of 1-cyclohexenylmethylbromide in 30 ml. of ethanol were refluxed for 3 hours and then the reaction mixture was processed as in Example I and purified over aluminum oxide. The residue was recrystallized from ethanol-ether-petroleum ether to obtain 1.8 g. of N-(cyclohexene-(1)-yl-methyl)-normorphine which sintered at 100–105° C. while developing gas after drying in the desiccator and melting at 205–208° C. (crude melting point).

PHARMACEUTICAL EXAMPLES

Example A—Ampoules

| | |
|---|---:|
| N-cyclohexylideneethyl-normorphine salicylate __mg__ | 50 |
| Dextrose _____ mg__ | 10 |
| Distilled water, ad. _____ ml__ | 2 |

Example B—Ampoules

| | |
|---|---:|
| N-cyclohexene-(2)-yl-normorphine salicylate __mg__ | 50 |
| Dextrose _____ mg__ | 10 |
| Distilled water, ad. _____ ml__ | 2 |

Example C— Ampoules

| | |
|---|---:|
| N-cyclohexene-(1)-yl-methyl-normorphine ____mg__ | 50 |
| Dextrose _____ mg__ | 10 |
| Distilled water, ad. _____ ml__ | 2 |

Preparation: The active ingredient and dextrose were dissolved in distilled water with heating and then the solution was filled into ampoules and sterilized.

Example D—Tablets

| | Mg. |
|---|---:|
| N-cyclohexylideneethyl-normorphine salicylate | 50 |
| Corn starch | 30 |
| Lactose | 60 |
| Colloidal silicic acid | 2 |
| Gelatine | 3 |
| Magnesium stearate | 3 |
| Talcum | 2 |
| | 150 |

Example E—Tablets

| | |
|---|---:|
| N-cyclohexene-(2)-yl-normorphine salicylate | 50 |
| Corn starch | 30 |
| Lactose | 60 |
| Colloidal silicic acid | 2 |
| Gelatine | 3 |
| Magnesium stearate | 3 |
| Talcum | 2 |
| | 150 |

Example F—Tablets

| | |
|---|---:|
| N-cyclohexene-(1)-yl-methyl normorphine | 50 |
| Corn starch | 30 |
| Lactose | 60 |
| Colloidal silicic acid | 2 |
| Gelatine | 3 |
| Magnesium stearate | 3 |
| Talcum | 2 |
| | 150 |

Preparation: The individual components were admixed intensely with one another and then were pressed into 150 mg. tablets.

Example G—Drops

| | |
|---|---:|
| N - cyclohexylideneethyl - normorphine silicylate _____ g__ | 5.00 |
| Methyl-p-hydroxybenzoate _____ g__ | 0.07 |
| Propyl-p-hydroxybenzoate _____ g__ | 0.03 |
| Ethanol _____ g__ | 20.00 |
| Polyethyleneglycol 400 _____ g__ | 20.00 |
| Demineralized water, ad. _____ ml__ | 100 |

Example H—Drops

| | |
|---|---:|
| N-cyclohexene-(2)-yl-normorphine salicylate _g__ | 5.00 |
| Methyl-p-hydroxybenzoate _____ g__ | 0.07 |
| Propyl-p-hydroxybenzoate _____ g__ | 0.03 |
| Ethanol _____ g__ | 20.00 |
| Polyethyleneglycol 400 _____ g__ | 20.00 |
| Demineralized water, ad. _____ ml__ | 100 |

Example I—Drops

| | |
|---|---:|
| N-cyclohexene-(1)-yl-methyl-normorphine ___g__ | 5.00 |
| Methyl-p-hydroxybenzoate _____ g__ | 0.07 |
| Propyl-p-hydroxybenzoate _____ g__ | 0.03 |
| Ethanol _____ g__ | 20.00 |
| Polyethyleneglycol 400 _____ g__ | 20.00 |
| Demineralized water, ad. _____ ml__ | 100 |

Various modifications of the compounds and method of the invention may be made without departing from the

We claim:
1. A compound selected from the group consisting of normorphines of the formula

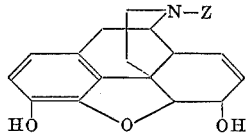

wherein Z is an allyl group, the double bond of which belong endocyclically or exocyclically to an alicyclic six-membered ring and their non-toxic, pharmaceutically acceptable acid addition salts.

2. A compound of claim 1 wherein the compound is selected from the group consisting of N-cyclohexylidene-ethyl-normorphine and its non-toxic, pharmaceutically acceptable acid addition salts.

3. A compound of claim 1 wherein the compound is selected from the group consisting of N-cyclohexene-(2)-yl-normorphine and its non-toxic, pharmaceutically acceptable acid addition salts.

4. A compound of claim 1 wherein the compound is selected from the group consisting of N-cyclohexene-(1)-yl-methyl-normorphine and its non-toxic, pharmaceutically acceptable acid addition salts.

References Cited
UNITED STATES PATENTS
3,299,072   1/1967   Bartels-Keith _____ 260—285

FOREIGN PATENTS
89,352   10/1960   Denmark.

OTHER REFERENCES
Von Braun, Ber. Deut. Chem., vol. 59, pp. 1081–90 (1926).

ALEX MAZEL, Primary Examiner

D. G. DAUS, Assistant Examiner

U.S. Cl. X.R.

260—256, 285, 648; 424—232, 253, 260